United States Patent
Pechthold

[15] 3,694,126
[45] Sept. 26, 1972

[54] APPARATUS FOR THE AUTOMATIC CONTINUOUS MANUFACTURE OF FILLED AND CLOSED CONTAINERS

[72] Inventor: Heinz Pechthold, Walldurn, Germany

[73] Assignee: Etablissement Bonatex, Vaduz, Liechtenstein

[22] Filed: May 4, 1970

[21] Appl. No.: 34,048

[30] Foreign Application Priority Data

May 9, 1969 Germany..........P 19 23 690.9

[52] U.S. Cl. ................425/326, 425/165, 425/387, 425/397, 425/444
[51] Int. Cl.....................B29d 23/03, B29c 17/00
[58] Field of Search........18/5 BF, 5 BP, 5 BM, 5 BE, 18/5 BS, 5 BQ, 5 BR, 20 B, 30 JA, 30 PA

[56] References Cited

UNITED STATES PATENTS

| | | | |
|---|---|---|---|
| 3,355,763 | 12/1967 | Willert | 18/5 BP |
| 3,357,046 | 12/1967 | Pechthold | 18/5 BF |
| 3,555,598 | 1/1971 | Mehnert | 18/20 B X |
| 3,340,569 | 9/1967 | Hagen | 18/5 BP |
| 3,415,915 | 12/1968 | Leclxyse et al. | 18/5 BP X |
| 3,117,348 | 1/1964 | Rees | 18/30 JA UX |
| 2,290,129 | 7/1942 | Moreland et al. | 18/20 B X |
| 3,100,913 | 8/1963 | De Matteo | 18/20 B |

FOREIGN PATENTS OR APPLICATIONS 732,103   4/1966   Canada......................18/5 BP

*Primary Examiner*—J. Spencer Overholser
*Assistant Examiner*—Michael O. Sutton
*Attorney*—Ernest G. Montague

[57] ABSTRACT

An apparatus for the automatic continuous production of filled and sealed containers formed by hollow bodies of thermoplastic material inserted in a mold in moldable condition, which bodies are expanded by the pressure filling method and filled, thereafter sealed and removed from the mold, which comprises at least one tube extruder rotatable about a vertical axis. A plurality of stationary working stations each with molding units and transportation devices, are provided. A rotary carrier is rotatably mounted about its vertical axis and includes at least two arms set off relative to each other and projecting beyond the working stations. The devices and parts thereof, respectively, at least for molding, filling and sealing, cooperate with the molding units, in accordance with the working succession, and are disposed in the arms.

8 Claims, 8 Drawing Figures

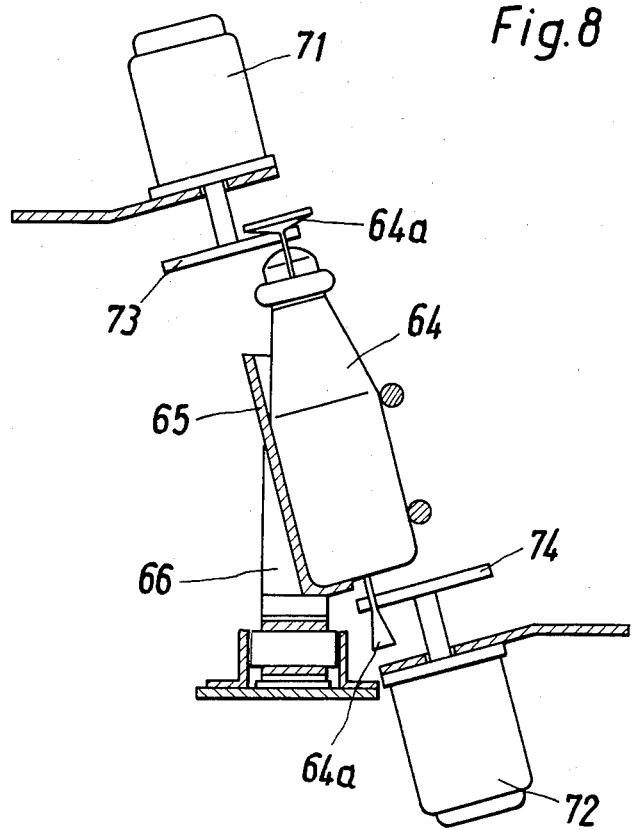

APPARATUS FOR THE AUTOMATIC CONTINUOUS MANUFACTURE OF FILLED AND CLOSED CONTAINERS

The present invention relates to an apparatus for the automatic continuous manufacture of filled and closed containers of thermoplastic material by the method of filling under pressure. The apparatus is particularly adapted for the manufacture of containers of all kinds, as for example bottles, cans, canisters, ampules, tubes etc., also for containers having large dimensions, from a hollow body enclosed in moldable condition in a mold and made of thermoplastic material, which is expanded in a single operation, substantially by charging of the filling material, the hollow body being urged against and formed on the walls of the hollow space of the mold, whereupon the container thus formed and filled is closed and removed from the mold.

The principles of the compression filling method for the manufacture of containers of the said type are nowadays thoroughly familiar to the man skilled in the art. They are described, e.g., in the French Pat. specification No. 1,338,656. It was, however, not possible up to now to attain a great number of units or an efficient manufacturing speed with a single machine, since the individual process steps require a certain time. In order to remedy this condition, apparatus was already proposed, with which one or several stationary plastification units were provided, to which periodically individual working stages, consisting of molding, filling and closing units are supplied. Although the attained number of manufactured pieces could be substantially increased, the apparatus was not completely satisfactory, since it required considerable space and was subject to breakdowns owing to its relatively complicated mechanical structure. Thus, upon failure of a single operating station, for example, the whole machine had to be stopped. Also considerable energy was required to accelerate or to brake the traveling working stages.

In the U.S. Pat. No. 3,357,046 of the same inventor, dated Dec. 12, 1967, which constitutes part of the disclosure of the present invention, an apparatus is disclosed, with which the above outlined deficiencies are at least partly eliminated.

The mentioned prior patent discloses also the provision of apparatus of compact structure, short switching times between the successive operations and sufficient operating time for the forming, filling and closure of the manufactured containers.

The prior patent also includes the provision of apparatus having a high production capacity and producing even voluminous hollow bodies rationally and cheaply, and to mold, fill and close the containers in a single operation.

The mentioned patent teaches further the provision of a plurality of stationary working stages each including molding, filling and closing units are disposed around a tube extruder rotatably mounted on a vertical axis, said working stages including severing and holding means for receiving and transporting severed sections of the extruded tube into the molding unit.

In apparatus set forth above, a high output is required, which requires in particular in machines for the production of voluminous container's apparatus which is technically and spatially voluminous.

The above-stated prior U.S. Pat. No. 3,357,046 teaches the arrangement of an apparatus which, compared with the previously known apparatus, makes possible with a lesser disturbance expectation the production of greater numbers per time unit of voluminous hollow bodies and of containers, respectively, in a rational and economical manner in one working step.

In said prior patent, this object was obtained such, that stationary molding-, filling- and sealing-units, disposed in working stations, are arranged about a tube extruder rotatably driven about a vertical axis and for the removal and for the production of sections of the extruded tube into the mold, transportation units equipped with severing and molding devices are provided.

It is one object of the present invention to provide an apparatus for the automatic continuous manufacture of filled and closed containers, wherein a rotary carrier rotatably-mounted about its vertical axis has at least two arms projecting beyond the working stations and set-off relative to each other in a horizontal plane, in which, in accordance with the working succession the devices and the parts thereof, respectively, for forming, filling, sealing and, under circumstances, for removing of the containers are provided which cooperate with the molding units.

By this arrangement, it is brought about, that even then, when for the obtaining of very high numbers of pieces, an apparatus is equipped with a great number of working stations, a great part of the apparatus elements has to be inserted in a simple structure in and on, respectively, the rotary carrier and its arms, which arrangement simplifies and economizes essentially the machine. Furthermore, by the arrangement of the present invention appreciable space is saved, in particular in the individual working stations.

With this and other objects in view, which will become apparent in the following detailed description, the present invention, which is disclosed by example only, will be clearly understood in connection with the accompanying drawings, in which:

FIG. 8 is a section through the conveyer band along the lines VIII—VIII of FIG. 3.

Figure 1:
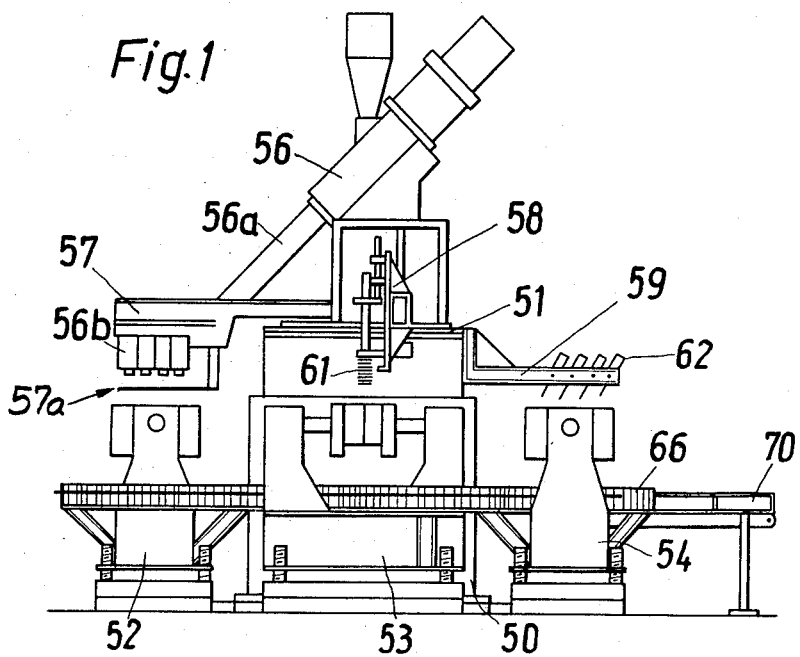
FIG. 1 is a schematic elevation of an apparatus having four working stations and a rotary carrier with four arms disposed at an equal height, of which each pair of adjacent arms is set-off relative to each other for an angle of 90°.
Figure 2:
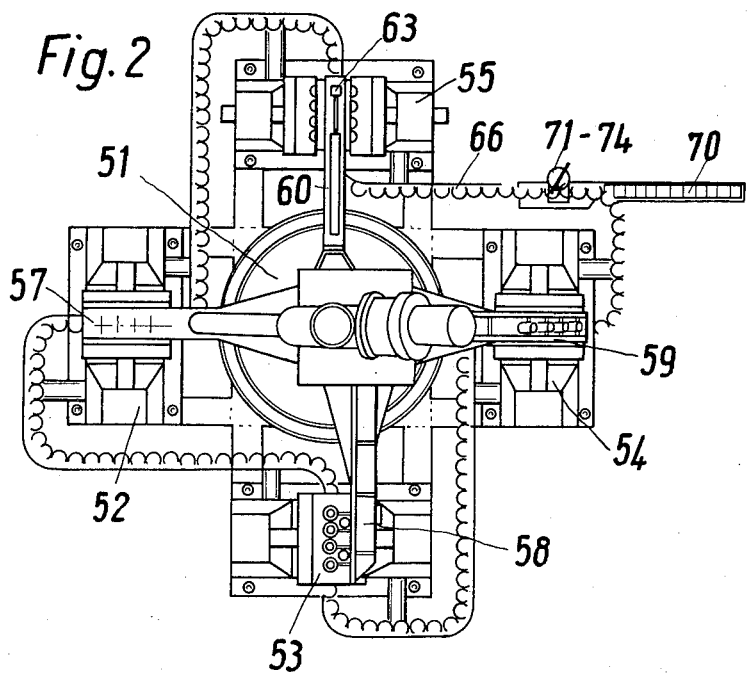
FIG. 2 is a top plan view of the apparatus disclosed in FIG. 1.

Referring now to the drawings, and in particular to FIGS. 1 and 2, the apparatus comprises substantially a base plate 50, a rotary carrier 51, rotatably-mounted for rotation about a vertically disposed shaft (not shown), and disposed above the base plate 50, and four working stations 52, 53, 54 and 55, disposed symmetrically about the rotary axis of the rotary carrier 51, which working stations receive each one of four molding units consisting of molds arranged adjacent each other. The rotary carrier is driven by an electric motor mounted in the base plate (not shown).

A tube extruder 56 as a mass-forming element sits on the rotary carrier 51, the unit of the tube extruder 56 being symmetrically-arranged to the rotary axis of the rotary carrier in a comparatively steep inclined position. Furthermore, the rotary carrier receives all sets and conduits, respectively, which are required for the molding, filling, sealing and removing of voluminous containers of synthetic material. Since these units and their feeding conduits are substantially known, for the purpose of a better demonstration, their showing has been omitted.

On the rotary carrier 51 are provided four arms 57, 58, 59 and 60 extending beyond the working stations 52, 53, 54 and 55, which arms 57, 58, 59 and 60 are set off in a horizontal plane with equal angles relative to each other, that means each arm is set off to its adjacent arm at an angle of 90°. The first arm 57 constitutes the extruder arm, in which a cylinder 56a of the extruder is connected with one unit of tube heads 56b corresponding with four forms of the working stations. These tube heads 56b project downwardly from the extruder arm and are in their working position exactly above one of the molding units of the working stations 52, 53, 54 or 55. In addition to the tube heads, this arm has also a known tube severing device 57a the mechanically movable severing band of which severs in a known manner the tube sections received from the forms of the working stations from the remaining tube.

The second arm 58 forms the filling arm in which the feeding conduits for the filling material is provided and the pumping station of which sits likewise on the rotary carrier. A unit of stretching- and filling-mandrels 61 projects from this filling arm, which mandrels are mounted coaxially into each other. The filling mandrels are moved out for a short time period into its working position for the filling process, in which the points of the filling mandrels are disposed tightly above the bottom of the synthetic tube stretched by the stretching-mandrel.

The third arm 59 constitutes the blow arm, in which a unit of blow cylinders 62 with molding plunges and their feeding conduits is provided. With these blow cylinders and molding plunges are molded the upper tube sections, still disposed in their own heat, after the previous pressure filling procedure to a sealing head.

The fourth arm 60 constitutes the delivery arm, which is equipped with a delivery device known as to its structure and with an electric control device. This delivery device becomes effective only when the filled and closed containers do not fall out after opening of the molds provided in the working stations. In such a case, a photocell, which is known, controls the mechanism of the delivery device, from which an element 63, moved by an electric impulse, throws out of the mold the container or containers.

The arms 57, 58, 59 and 60 of the rotary carrier 51, rotating during the working cycle in a rotary direction, rest for short time periods above each of the four working stations 52, 53, 54 and 55 in an exactly measured working position to the molds of these working stations, so that in each of the four working stations 52, 53, 54 and 55 a continued working procedure is assured.

Figure 3:
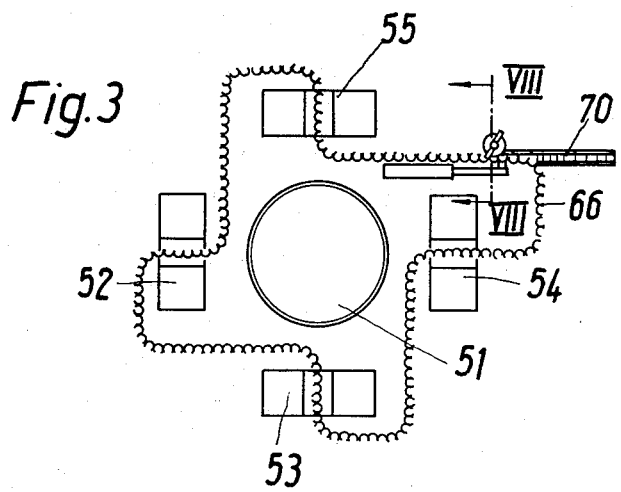
FIG. 3 is a schematic top plan view of the apparatus shown in FIG. 2 at a reduced scale.
Figure 4:
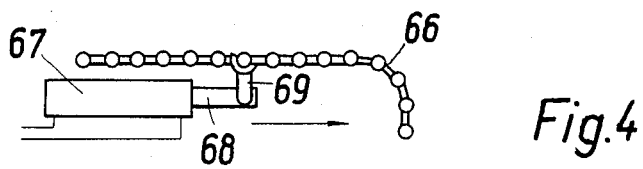
FIGS. 4–7 are schematic showings of a drive for a conveyer band disclosed in different working positions.
Figure 5:
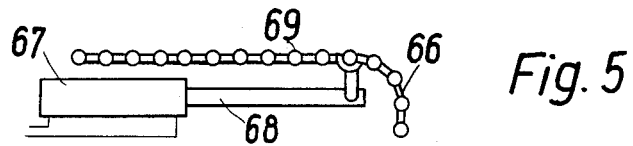
Figure 6:
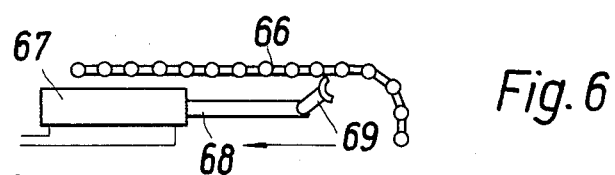
Figure 7:
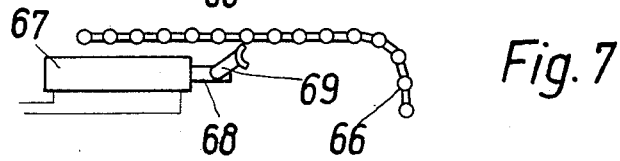

The filled and sealed containers 64 fall after opening of the molds of the working stations 52, 53, 54 and 55 into receiving buckets 65 of a conveyer band 66, which passes the zones of the working stations (FIGS. 2 and 3). As shown in FIG. 8, the receiving buckets 65 are formed in cup-shape and are disposed on the conveyer band such, that they pass the zones of the working stations in an inclined position with the side open pointing towards the molding units. The conveyer band 66 is driven intermittently, as shown in FIGS. 4–7, with drive pistons 68 which are moved in a pressure cylinder 67 and electromotorically operable, the movement stroke of the drive pistons 68 being capable of limitation by means of limit switches settable in their position. A driver 69 is pivotally connected with the drive pistons 68, which driver 69, as shown in FIG. 4, grips with a claw behind a member of the conveyer band 66. Upon movement of the drive pistons 68 in the direction of the arrow, shown in FIG. 4, the driver 69 joins the the conveyer band 66 up to the position shown in FIG. 5. FIGS. 6 and 7 disclose the return motion, whereby the driver 69 slides outside of the conveyer band 66, due to the provision of a spring guide, which is known, and is not shown for this reason. Only upon reaching the position of FIG. 7 of the drawings, the driver 69 grips again behind a member of the conveyer band 66. During each of these movements the conveyer band 66 is advanced for the stroke, which is required by the reception of the containers removed from the four working stations.

As is particularly clearly shown in FIGS. 2 and 3, at one point, a known exit band 70 with a guide joins the conveyer band 66, on which exit band 70, the filled containers 64 are fed from the conveyer band 66 passing the working stations to a packing station. Directly in front of the connecting point of this exit band 70 are provided, as shown in FIG. 8, a drive apparatus 71 and 72 each, above and below the conveyer band 66, with a fast rotating abutment wing 73 and 74, which wings serve the cutting of container-projections 64a, which have been formed after the sealing of the containers from the end-sections of the tube.

While I have disclosed one of the present invention, it is to be understood that this embodiment is given by example only and not in a limiting sense.

I claim:

1. An apparatus for the automatic continuous production of filled and sealed containers formed by hollow bodies of thermoplastic material inserted in a mold in moldable condition, which bodies are expanded by the pressure filling method and filled, thereafter sealed and removed from the mold, comprising at least one tube extruder rotatable about a vertical axis, a plurality of stationary working stations, each with molding units, and disposed about the vertical axis of said tube extruder, a rotary carrier rotatably mounted about its vertical axis and including a plurality of arms set off relative to each other and projecting beyond said working stations, and extruding and severing, expanding and filling, container sealing, and container removing devices and parts thereof, respectively, operatively connected with said molding units, in accordance with a working cycle, and being disposed in said arms.

2. The apparatus, as set forth in claim 1, wherein
said rotary carrier having four of said arms set off relative to each other at equal angles,
the first of said arms receiving said extruding and section severing devices and parts thereof, respectively, in the direction of rotation of said arms,
the second of said arms receiving said expanding and filling devices and parts thereof, respectively,
the third of said arms receiving said container sealing devices and parts thereof, and
the fourth of said arms receiving said container removing devices and parts thereof for removing of said container.

3. The apparatus, as set forth in claim 1, wherein
mass-forming elements including a guide unit of said tube extruder are disposed on said rotary carrier symmetrically to the rotary axis of the latter and in a relatively steep position.

4. The apparatus, as set forth in claim 2, wherein
said working stations, as well as said arms have a plurality of molding-, filling-and sealing units disposed in radial direction towards the rotary axis of said rotary carrier.

5. The apparatus, as set forth in claim 1, which includes
a conveyer band passing zones of said working stations and
equipped with buckets of any shape for receiving and removing said filled and sealed container-projecting jut out from said buckets.

6. The apparatus, as set forth in claim 5, which includes
a drive piston, operable electromotorically and moved in a pressure cylinder, driven intermittently, and
limit switches settable as to their position and disposed within the path of said drive piston and limiting the movement stroke of the latter.

7. The apparatus, as set forth in claim 1, which includes
at least two fast rotating abutment wings disposed above and below said conveyer band in the removal path of said filled and sealed containers for cutting off container-projections.

8. The apparatus, as set forth in claim 5, which includes
a guide with connected exit band, and
said guide is coordinated to said conveyer band.

* * * * *